Patented Oct. 26, 1937

2,096,876

UNITED STATES PATENT OFFICE 2,096,876

BITUMINOUS COMPOSITIONS

Charles J. Bitzer, Brooklyn, N. Y., assignor to Standard Oil Development Company, a corporation of Delaware No Drawing. Application May 25, 1934, Serial No. 727,517

2 Claims. (Cl. 134—51)

This invention relates to a composition composed of bitumen, finely ground mica, and a secondary mineral such as slate, silica, china clay, talc, or similar product.

An object of this invention is to obtain an improved bituminous protective material with superior properties, particularly in increased tensile strength, increased resistance to impact, slippage, soil-stress action, and clod pressure deformation without deterioration in anti-corrosion properties, dielectric strength, impermeability to water, etc., and at the same time retaining its electrical non-conductivity and non-settling of the filler. The bituminous compositions of the present invention show an increased resistance to deformation or displacement by both a steadily applied force and by the action of subterranean adsorptive clays alternately wetted and dried, which tend to distort the coating by their swelling and contraction. This action is referred to as "soil-stress" action. Bituminous compositions embodying all of these qualities at one time are particularly adapted, among other uses, as enamels for the protection of pipe lines.

Ground mica, while imparting to mineral-filled bitumens such properties as chemical inertness, tensile strength, and resistance to clod pressure, produces extremely "short" enamels of high viscosity and working temperature, particularly when bitumens of high softening points are employed. In addition, the mica filler settles rapidly in the molten enamel at working temperatures and thus produces coatings on the pipe of varying composition and porosity as well as the formation of coke in the kettle resulting from the carbonization of the precipitated mass.

When a bitumen of sufficiently high softening point, i. e. 185–190° F. is used as a pipe coating base, not more than 15% by weight of #80 mica flake can be tolerated for the production of a hot fluid material. Higher percentages produce mixtures which have the properties of mastics when hot and they cannot be readily flowed upon a pipe by the usual procedures. When slate flour is used with the same base, up to 50% by weight may be added and a fluid mixture obtained on heating. Slate flour, being a powdered crystalline filler, does not possess the same qualities as mica flake. The advantages of slate flour as a mineral filler are: chemical resistance, ability to remain satisfactorily suspended in molten enamels when of the satisfactory degree of fineness, and the ability to be incorporated into a bitumen in large quantities without producing a mixture lacking in fluidity or requiring high working temperatures. The presence of relatively large weight percentages of filler in a pipe coating is desirable since the reinforcing action of the filler produces such properties as resistance to soil-stress action, slippage, and shatter upon impact.

According to this invention, it has been found that these two minerals, representative of two distinct types of fillers, may be compounded and added to a bituminous base with a resultant homogeneous mixture embodying all of the advantages of the fillers used separately, in addition to the material reduction of the individual weaknesses of these fillers.

As examples of the advantages of using a compounded mineral filler in a bituminous composition suitable for use as a pipe coating, the following results of tests are presented:

| Sample No. | 1 | 2 | 3 | 4 | 5 |
|---|---|---|---|---|---|
| Wt. percent 185°–190° F. softening point bitumen | 60 | 60 | 60 | 60 | 85 |
| Wt. percent slate flour | 40 | 35 | 32.5 | 30 | 0 |
| Wt. percent No. 80 mica | 0 | 5 | 7.5 | 10 | 15 |
| Softening point (ball and ring) | 205 | 211 | 217 | 220 | 207 |
| Pen. 150/100/5'' | 35 | 30 | 22 | 17 | 34 |
| Tensile strength (pounds per square inch) | 209 | 387 | 350 | 415 | 263 |
| Shatter area (square inch) | 12.3 | 11.1 | 10.9 | 8.7 | 9.6 |
| Clod pressure (1/64 inch) | 30 | 20 | 8 | 4 | |

Other minerals, such as silica, china clay, talc, or similar products, may be used in place of the slate flour. The bitumen of 185° to 190° F. softening point has a tensile strength of 40 pounds per square inch.

Bituminous compositions suitable for use as pipe enamels containing between 5 and 10% of No. 80 mica flake and 30 to 35% of slate flour in 60% by weight of a bituminous base of 185–190° F. softening point are fluid and have as low a working temperature (400° F.) as bituminous compositions made with the same base but containing an optimum amount of each filler used separately, i. e. 15% by weight of mica and 40% by weight of slate flour. In the compounded filler, mica flake in quantities up to 10% by weight does not settle in the molten bituminous composition as the presence of the slate flour in amounts of 30% and above by weight retards this tendency. The softening points of the bituminous compositions, made according to this invention, are higher than those of enamels made with one filler alone. The penetrations at 150° F. of the bituminous compositions, prepared according to this invention, are lower than those of the bituminous compositions containing only one filler, illustrating the superior resistance of these materials to deformation by applied pressure. The tensile strengths of these bituminous compositions are markedly higher than those of the enamels containing only one filler, the values for the slate and mica fillers alone being 209 and 263 lbs. per square inch respectively, while the compounded fillers increased their value to between 350 and 415 lbs. per square inch.

Having thus described the invention it is not intended that it be limited by any of the specific examples given but it is desired to claim all inherent novelty as broadly as the prior art permits.

I claim:

1. A bituminous composition having a tensile strength higher than that of the bitumen, comprising between 5 and 10% of ground mica and between 30 to 35% of ground slate homogeneously admixed with 55 to 65% of bituminous material having a softening point of about 180° to 190° F.

2. A bituminous composition having a tensile strength higher than that of the bitumen, comprising 10% of ground mica and 30% of ground slate homogeneously admixed with 60% of bituminous material having a softening point of about 185° to 190° F.

CHARLES J. BITZER.